United States Patent Office 3,655,687
Patented Apr. 11, 1972

3,655,687
DERIVATIVES OF 5-HYDROXYMETHYL-3-SUBSTITUTED-2-OXAZOLIDINONES, PROCESS OF PREPARATION THEREOF AND THERAPEUTIC APPLICATION
Claude P. Fauran and Guy M. Raynaud, Paris, Rene A. Oliver, Vincennes, Val de Marne, and Colette A. Douzon, Paris, France, assignors to Delalande S.A., Courbevoie, Hauts-de-Seine, France
No Drawing. Filed Mar. 16, 1970, Ser. No. 20,020
Claims priority, application Great Britain, Mar. 18, 1969, 14,260/69
Int. Cl. C07d *85/28*
U.S. Cl. 260—307 C    2 Claims

ABSTRACT OF THE DISCLOSURE

Compounds of the formula

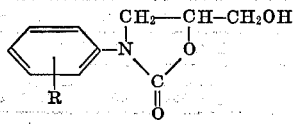

in which R is H, Cl, F, $CH_3$ or $CF_3$. The compounds are prepared by cyclizing with ethyl carbonate, a compound of the formula

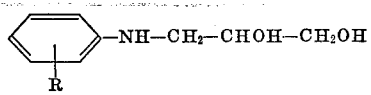

The compounds have anti-depressive, myorelaxing, tranquilizing, sedative, analgesic, anti-convulsive, anti-pyretic, anti-inflammatory and uricosuric activites.

--- in which R represents a hydrogen atom, a halogen atom, an alkyl radical having 1 to 4 carbon atoms or a trifluoromethyl radical.

The process for the preparation of the compounds according to the present invention comprises cyclising, by the action of ethyl carbonate, a 1-phenylamino-2,3-propanediol of the general formula:

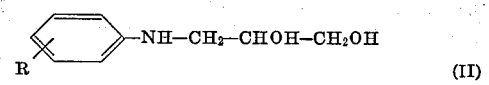

in which R has the same significance as in Formula I.

The following preparation is given, by way of non-limitative example, to illustrate the present invention.

EXAMPLE 5-hydroxymethyl-3-(m-trifluoromethyl phenyl)-2-oxazolidinone. (Code No. 68121)

59 g. of 1-(m-trifluoromethyl phenylamino)-2,3-propanediol and 118 g. of ethyl carbonate are introduced into a distillation apparatus. The mixture is progressively heated to about 110° C. when dissolution is obtained. Then, 12 ml. of a 5% solution of sodium methylate in methanol is added thereto. The distillation of the ethanol formed during the course of the reaction is then observed. Upon completion thereof any excess ethyl carbonate is removed under reduced pressure and the residue obtained is crystallized in isopropyl ether.

Melting point=80° C.
Yield=80%
Empirical formula=$C_{11}H_{10}F_3NO_3$

*Elementary analysis.*—Calculated percent: C, 50.58; H, 3.86; N, 5.36. Found percent: C, 50,74; H, 3.76; N, 5.56.

The compounds listed in the following table have been prepared according to the process of the above example:

TABLE I

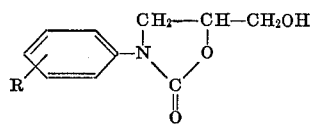

| Code No. | R | Empirical formula | Mol wt. | M.P., °C. | Yield, percent | Calculated | | | Found | | |
|---|---|---|---|---|---|---|---|---|---|---|---|
| | | | | | | C | H | N | C | H | N |
| 67360 | H | $C_{10}H_{11}NO_3$ | 192.20 | 129 | 75 | 62.16 | 5.74 | 7.25 | 62.20 | 5.87 | 7.40 |
| 68292 | m-F | $C_{10}H_{10}FNO_3$ | 211.19 | 96 | 87 | 56.87 | 4.77 | 6.63 | 56.88 | 4.92 | 6.79 |
| 69155 | p-F | $C_{10}H_{10}FNO_3$ | 211.19 | 116 | 68 | 56.87 | 4.77 | 6.63 | 56.97 | 4.77 | 6.83 |
| 69275 | o-F | $C_{10}H_{10}FNO_3$ | 211.19 | 94 | 60 | 56.87 | 4.77 | 6.63 | 56.75 | 4.73 | 6.67 |
| 6922 | p-Cl | $C_{10}H_{10}ClNO_3$ | 227.64 | 104 | 55 | 52.75 | 4.43 | 6.15 | 53.01 | 4.53 | 6.05 |
| 69204 | p-$CH_3$ | $C_{11}H_{13}NO_3$ | 207.22 | 145 | 66 | 63.75 | 6.32 | 6.76 | 63.93 | 6.10 | 6.88 |
| 69276 | m-$CH_3$ | $C_{11}H_{13}NO_3$ | 207.22 | 76 | 70 | 63.75 | 6.32 | 6.76 | 63.70 | 6.43 | 6.78 |
| 9217 | o-$CH_3$ | $C_{11}H_{13}NO_3$ | 207.22 | 64 | 69 | 63.75 | 6.32 | 6.76 | 63.71 | 6.37 | 6.88 |

---

The present invention concerns novel derivatives of 5-hydroxymethyl-3-substituted-2-oxazolidinones, their process of preparation and their therapeutic application.

The compounds according to the present invention correspond to the general formula:

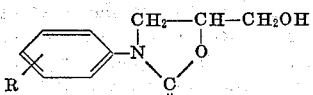

The compounds of Formula I experimentally exert anti-depressive, myorelaxing, tranquillising, sedative, analgesic, anti-convulsive, anti-pyretic, anti-inflammatory and uricosuric activities. Moreover, their toxic effects on animals in the laboratory are little marked.

(1) *Anti-depressive properties.*—The compounds of Formula I are capable of opposing hypothermia and the ptosis provoked by reserpine in the rat and the mouse, as well as the ulcers provoked by reserpine in the rat. Moreover, they oppose the catalepsy provoked by prochlorperazine in the rat.

By way of example, several results obtained are listed in the following table:

compounds of Formula I are listed in the following table:

TABLE II

| Code No. | Hypothermia | | Ptosis | | | | Ulcers | |
| --- | --- | --- | --- | --- | --- | --- | --- | --- |
| | | | Rat | | Mouse | | | |
| | Dose[1] | Effect, °C. | Dose[1] | Effect, percent | Dose[1] | Effect, percent | Dose[1] | Effect, percent |
| 67360 | 200 | −3.3 | 200 | 70 | 200 | 55 | | |
| 68121 | 100 | −3.3 | | | 100 | 45 | 100 | 77 |
| 68292 | 100 | −2.6 | 100 | 75 | 100 | 50 | 100 | 85 |
| 6922 | | | 100 | 45 | 100 | 55 | | |
| 69204 | 100 | −2.9 | | | | | | |
| 69276 | | | | | | | 100 | 50 |

[1] Expressed in mg./kg./p.o.

(II) Myorelaxing properties.—The compounds of Formula I provoke in the mouse the loss of the righting reflex and inhibit the traction reflexes and the maintenance on a rotating rod.

By way of example, the results obtained with two compounds of Formula I are listed in the following table:

TABLE III

| Code No. | Traction test, $ED_{50}$ | Rotating rod test, $ED_{50}$ |
| --- | --- | --- |
| 67360 | 300 mg./kg./p.o. | 160 mg./kg./p.o. |
| 68121 | | 110 mg./kg./p.o. |

(III) Tranquillising and sedative action.—These effects are shown by a diminution of exploration curiosity in the enclose of an actimetric cage and of escape in an open field. The compound of Formula I reduce the aggressiveness provoked in the passage of an electric current and lower the body temperature of animals. The narcotic effects of penthiobarbital are equally reinforced.

The results obtained with two compounds of Formula I are listed in the following table:

TABLE IV

| Code No. | Actimetric cage | | Evasion test | | Potentialisation of penthiobarbital | |
| --- | --- | --- | --- | --- | --- | --- |
| | Dose[1] | Effect, percent | Dose[1] | Effect, percent | Dose[1] | Effect, percent |
| 67360 | 90 | 50 | 200 | 70 | 200 | 80 |
| 68121 | 100 | 70 | | | 80 | 50 |

[1] Expressed in mg./kg./p.o.

(IV) Analgesic activity.—This activity is particularly pronounced against the painful stretching provoked in the mouse by the intraperitoneal administration of phenyl benzoquinone or acetic acid.

The results obtained with two compounds of Formula I are shown in the following table:

TABLE V

| Code No. | Protection against phenylbenzoquinone | |
| --- | --- | --- |
| | Dose in mg./kg./p.o. | Effect, percent |
| 67360 | 90 | 50 |
| 68121 | 45 | 50 |

(V) Anti-convulsive properties.—The compounds of Formula I exert in the mouse an antagonism against the lethal effects of cardiazol, strychnine and nicotine. They equally show activity against the tonic hyperextension of an excessive electric shock.

By way of example, the results obtained with several

TABLE VI

| Code No. | Antagonism against— | | | | | |
| --- | --- | --- | --- | --- | --- | --- |
| | Cardizol | | Strychnine | | Nicotine | |
| | Dose[1] | Effect, percent | Dose[1] | Effect, percent | Dose[1] | Effect, percent |
| 67360 | | | 140 | 50 | | |
| 68121 | 120 | 50 | 100 | 50 | 100 | 80 |
| 68292 | | | 100 | 70 | 100 | 60 |
| 6922 | | | 100 | 100 | | |
| 69155 | | | 100 | 65 | | |

[1] Expressed in mg./kg./p.o.

(VI) Anti-pyretic action.—This action is manifested by a diminution of the experimental fever provoked by the administration of barm in the cat.

(VII) Anti-inflammatory effect.—The under-plantar oedema provoked in the rat by the administration of carraghenine is diminished by the compounds of the present invention.

(VIII) Uricosuric action.—After repeated oral administration in the rat, the compounds of Formula I provoke an augmentation of the urinary eliminations of uric acid.

In consequence of the results shown above, and the values appearing in the following table, the difference between the pharmacologically-active dose and the lethal dose is sufficiently great to enable the compounds of Formula I to be utilised in therapeutics.

TABLE VII

| Code No.: | LD50 P.O. (mouse,) mg./kg. |
| --- | --- |
| 67360 | >1600 |
| 68121 | 1400 |
| 68292 | 1500 |
| 6922 | 1050 |
| 69155 | 1200 |
| 69204 | >4000 |
| 69276 | 1850 |

The compounds of Formula I are indicated in the case of depression and neurosis by depressive and anxious components. They equally possess a favourable effect against contractural and inflammatory pains, with or without hyperthermia.

They may be administered in the form of tablets and gelules containing 50 to 250 mg. of active ingredient.

Hence, according to the present invention there is also provided a therapeutic composition comprising a compound of Formula I together with a therapeutically- acceptable carrier.

What we claim is:
1. A compound of the formula
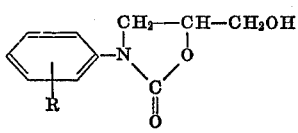
in which R is selected from the group consisting of hydrogen, chlorine, fluorine, methyl and trifluoromethyl.
2. A compound as claimed in claim 1, in which R is chlorine or fluorine.
References Cited
UNITED STATES PATENTS
2,437,388   3/1948   Homeyer _____ 260—307
3,133,932   5/1964   Horn et al. _____ 260—307
ALEX MAZEL, Primary Examiner
R. V. RUSH, Assistant Examiner
U.S. Cl. X.R.
424—272